Oct. 13, 1964     J. S. BRADLEY ETAL     3,153,147
GAS LIFT BOILS DETECTION

Filed May 9, 1961     2 Sheets-Sheet 2

ATTEST
Charles F. Steininger

INVENTORS
John S. Bradley
Thomas F. Moore
BY
Attorney

United States Patent Office 3,153,147
Patented Oct. 13, 1964

3,153,147
GAS LIFT BOILS DETECTION
John S. Bradley and Thomas F. Moore, Dallas, Tex.,
assignors to The Atlantic Refining Company, Philadelphia, Pa., a corporation of Pennsylvania
Filed May 9, 1961, Ser. No. 108,930
9 Claims. (Cl. 250—83.3)

The present invention relates to exploration methods and equipment designed to locate petroliferous deposits. More specifically, the invention relates to indirect methods and equipment for locating gas and oil seeps in water-covered areas. Most specifically, the invention relates to indirect, reconnaissance type methods for locating petroliferous deposits under bodies of water by measuring at the surface of the water effects caused by seeps lifting underlying surface and subsurface waters to the surface.

Heretofore, naturally occurring seeps from petroliferous deposits have been located by various types of direct and indirect methods of exploration. The direct methods usually rely on gas analyzers or electromagnetic energy, such as ultraviolet energy, to detect the presence of hydrocarbons in the atmosphere or in earth samples. The indirect or geochemical methods rely on the detection of various indicators to determine the possible presence of petroliferous deposits. Some of the more common indicators are certain metals, $H_2$, CO, sulfides, salinity and hydrocarbon consuming bacteria.

All of the presently known direct and indirect methods are subject to certain inherent disadvantages and limitations. This is especially true in detecting seeps in water-covered areas where the only methods with any significant history of success are the direct methods disclosed in Slobod et al. 2,918,579, and copending application, Serial No. 85,081, now Patent 3,143,648, both owned by a common assignee. Although Slobod et al. has been extremely successful in locating seeps in water-covered areas, it too has certain inherent limitations. Since the Slobod method is designed to break gas out of sampled water and to analyze the gas for hydrocarbon content, the speed of traverse and the area investigated are necessarily limited to the speed of the ship or vessel carrying the breakout equipment and the analyzer. Although the speed of this type of survey is much faster than previous methods of locating seeps in water-covered areas, a method capable of even higher speeds offers obvious and attractive economic advantages.

To the best of applicants' knowledge, there is no reconnaissance type indirect exploration method presently available that is suitable for large area seeps investigation, especially in water-covered areas. The indirect methods presently available are unduly restricted in their area of operation, amount of coverage and speed of analysis. Since earth samples are required in most of these methods, the area covered in one day's survey is limited by the time consumed in securing the necessary earth samples obtained at various depths below the surface of the floor or bed of the water-covered area. These prior art methods are further restricted in their operation by the complicated and time consuming laboratory analyses required in determining if the indicator is present in the earth samples so laboriously obtained.

In attempting to overcome these serious limitations, applicants have unexpectedly found, after extensive research and experimentation, that naturally occurring oil and gas seeps in water-covered areas can be successfully located by using phenomena appearing at the surface of the water in water-covered areas instead of relying on indicators contained in earth or subsurface water samples secured at depths below the surface of the earth.

Accordingly, it is an object of the present invention to provide improved indirect methods and equipment for exploring for petroliferous deposits.

Another object of the present invention is to provide high speed, economical indirect methods and equipment for locating petroliferous deposits.

Another object of the present invention is to provide improved, indirect methods and equipment for exploring for petroliferous deposits by locating indications of naturally occurring gas seeps in water-covered areas.

Another object of the present invention is to provide improved methods and equipment for locating naturally occurring gas seeps indications which, if desired, may be supplemented with other methods and equipment to locate the seep and validate it as originating from a petroliferous deposit.

Another object of the present invention is to provide improved methods and equipment for locating naturally occurring gas seeps in water-covered areas by detecting surface anomalies resulting from waters below the surface of an area of interest lifted to the surface by the gas seeps.

Another object of the present invention is to provide methods and equipment that can be used with various types of vehicles to locate naturally occurring gas seeps indications.

Another object of the present invention is to provide a method and equipment for locating naturally occurring gas seeps by measuring temperature differentials at the surface of a water-covered area.

Another object of the present invention is to provide a method and equipment for locating naturally occurring gas seeps by measuring resistivity at the surface of a water-covered area.

Another object of the present invention is to provide a method and equipment for validating seeps indications in a water-covered area.

These and other objects and advantages of the present invention will be apparent from a detailed description of the invention and its variations.

Before commencing the description, however, it is necessary to set forth definitions of certain terms used hereinafter. The term "body of water" or "water body" includes all bodies of salt water, such as, oceans, bays, lakes, etc., and all fresh-water bodies, such as, lakes, rivers, streams, ponds, etc., that are located at least in part on the surface of the earth and exposed to the atmosphere. The term "underlying surface waters" includes the waters in a body of water existing between the immediate surface of the body of water and the ground forming the floor or bed of the body of water. The term "subsurface waters " includes all waters located below the surface of the ground, such as, the generally fresh ground waters, the more saline formation waters, etc.

It is well known that many subsurface petroliferous deposits are located in fissured, faulted or fractured reservoirs and that gaseous and liquid hydrocarbons escape through the fissures, etc., into the earth's atmosphere. These escaping hydrocarbons migrate upwardly to zones of lower pressures and pass through various subsurface waters rich in minerals. As these escaping hydrocarbons move to zones of lower pressures, they take on a more gaseous phase and tend to lift to the surface portions of subsurface waters and minerals dissolved or entrained therein. As described above, various geochemical methods examine soil samples for indicators, such as, the lifted minerals, hydrocarbon waxes, hydrocarbon consuming bacteria, etc., to locate petroliferous deposits.

Applicants have unexpectedly found that contrary to the prior art the collection of subsurface samples, complicated laboratory analyses and other time consuming manipulative steps are not required to practice indirect methods of exploration. They have found that measuring the surface of a body of water for a preselected property affected by the seep's lifting action provides a greatly improved indirect method of exploration in water-covered areas. This improved method not only significantly increases the speed of analysis and the resulting speed of traverse, it also reduces the cost of each survey by at least an order of ten over the cost of the cheapest comparable water reconnaissance method heretofore available. Various surface water properties affected by the lifting action of the hydrocarbon seep can be used to detect the seep. Usually, the preferred method is to measure temperature changes caused by the seep lifting underlying surface waters to the surface of the body of water. However, other effects, such as, resistivity changes, can be used, as will be detailed hereinafter.

It has been determined that when a body of water overlies a petroliferous deposit, the lifting action of a hydrocarbon seep produces identifying thermal and resistivity gradients on the surface of the water-covered area. The thermal gradient is produced by the seep lifting the underlying surface waters, that become colder with depth, to the surface. The resistivity gradient is produced by the seep lifting subsurface waters, that become more mineralized with depth, to the surface. If the seep is in a salt water body, the lifting action also disturbs the iso-sals in the underlying surface water causing additional change in the surface resistivity gradient. As will be pointed out hereinafter, one or both of these surface gradients may be present, depending upon the type of water-covered area under investigation. When either or both of the surface gradients are present, corresponding vertical gradients are present in the underlying surface waters. These vertical gradients are also created by the seep, as described above. FIGURE 1 shows the seep's lifting action affecting the vertical thermal gradient of underlying surface waters. If a salinity gradient is already present in the underlying surface waters, i.e., in salt water, the iso-sals, reflecting this gradient, are affected by the seep's lifting action in generally the same manner as the iso-therms shown in FIGURE 1.

Briefly described, the invention, therefore, provides a greatly improved, high speed, inexpensive, indirect exploration method for locating naturally occurring hydrocarbon seeps in water-covered areas by in situ detection of variations in preselected physical properties of the body of water. The basic method covers the steps of measuring the preselected property of the water affected by the emission of the seep from the petroliferous deposit and the passage thereof through the overlying subsurface formations and the body of water, and correlating anomalies with locations in the body of water.

Let us now consider the use of the invention in locating gas seeps indications in various types of water-covered areas.

The location of a hydrocarbon seep indication in a water-covered area can be carried out from an air-borne or surface-borne vehicle. Since both physical and chemical properties of the surface water can be changed by the lifting action of the seep, various methods can be used to locate the seep. The preferred method of operation depends on the body of water being investigated.

The preferred method of detecting seep indications in salt water bodies and in most fresh-water bodies is to measure temperature variations. This type of survey is highly successful since the action of the seep in lifting underlying surface waters to the surface disturbs the normal thermal stratification of the water body and causes characteristic temperature variations or anomalies in the surface of the water. Depending upon the temperature of the atmosphere and the depth of the water, a significant increase or decrease in the temperature at a point on the surface indicates the possible presence of a gas seep. It is well known that the temperature of the atmosphere directly affects the temperature of the surface of a water body and affects temperatures of underlying surface waters in decreasing amounts according to depth. Since the temperatures of underlying surface waters decrease with depth (deep portions of the ocean excepted) regardless of the atmospheric temperature, under most conditions the gas lift action of the seep causes cooler spots to appear in the surface of the water body. Only in certain limited exceptions, such as in areas where the water-covered area is relatively shallow and the atmospheric temperature is very cold, will a warmer spot indicate the presence of a gas seep. The terms cold and warm spots are used here in a relative sense and are, therefore, not limited to any particular temperature range.

Figure 1:
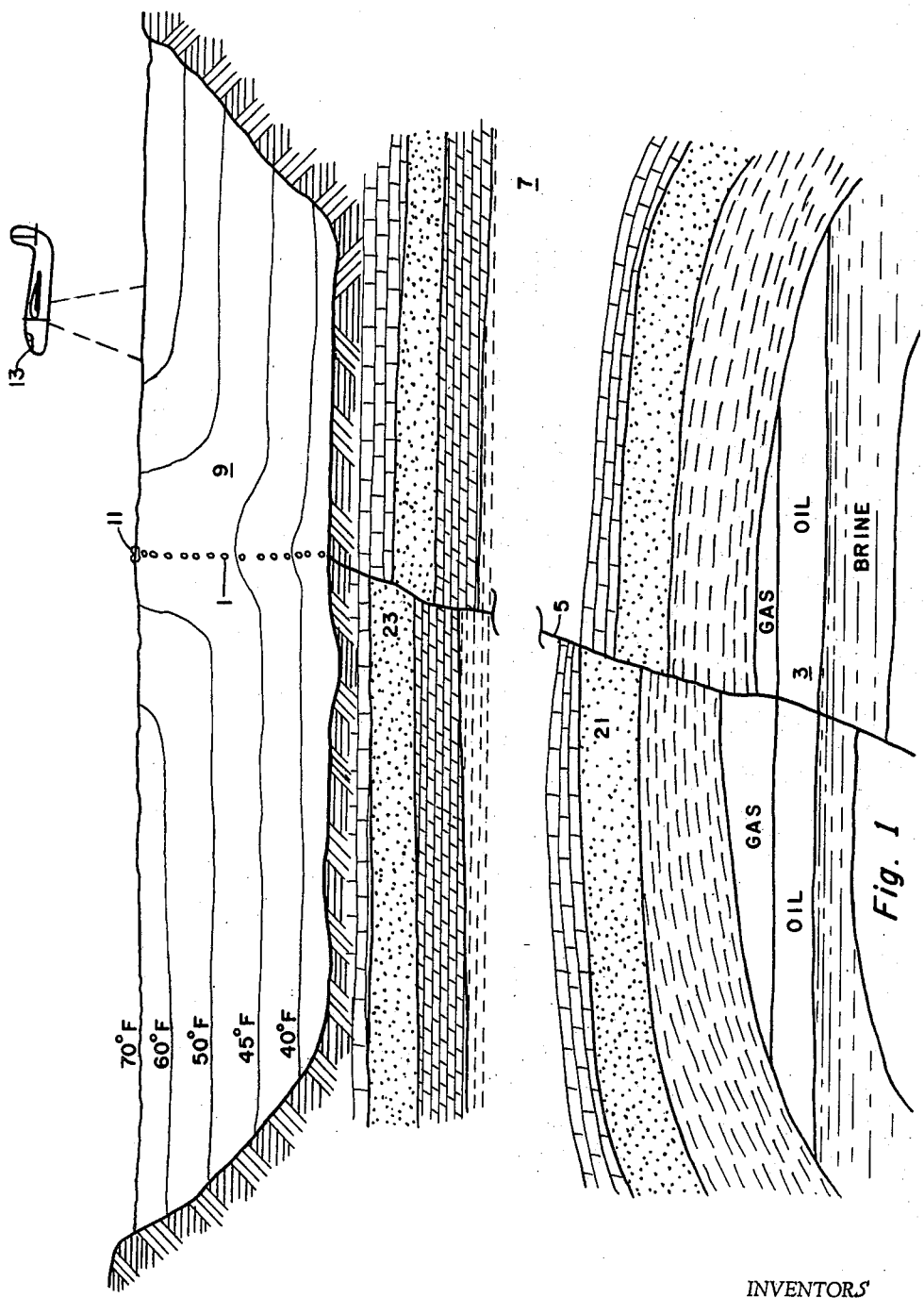
FIGURE 1 shows a gas lift boil in a water-covered area.
Figure 2:
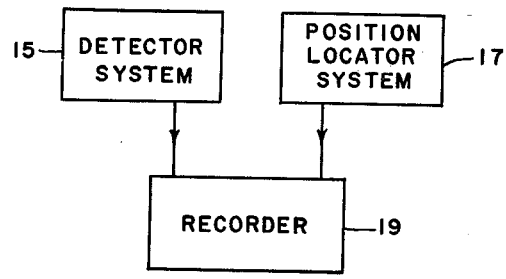
FIGURE 2 shows a block diagram of a system for locating seep indications.

Refer now to FIGURE 1 showing a naturally occurring hydrocarbon seep located in a body of water. Gas bubbles 1 are shown seeping from petroliferous deposit 3 through fault 5 located in a portion of the earth 7 beneath body of water 9. As bubbles 1 containing methane gas and other hydrocarbons rise to the surface of body of water 9, they create a lifting action which moves the cooler underlying surface waters (shown in terms of isotherms displaying temperatures present in an extreme case) to the surface at bubble point or boil point 11. The bubbles may or may not be visible. However, this point will usually register the lowest temperature on the surface, and this effect of the cooler, underlying surface waters decreases as the waters leave the point of boil in ever increasing concentric circles. This temperature anomaly in the vicinity of point 11 can be detected from a water-borne vehicle, not shown, or an air-borne vehicle 13 mounting well known detecting components as shown in FIGURE 2. FIGURE 2 discloses a detector 15, position locator 17 and recorder 19. As will be pointed out hereinafter, all of the components are standard commercially available equipment and in certain types of operations the position locator and recorder are not required.

If a water-borne vehicle is used to conduct the survey, detector 15 may be any well known commercially available temperature measuring system using thermocouples, bolometers, thermometers, etc., that is capable of presenting a temperature profile. The recorder can be automatic or merely an operator noting the temperature variations. The position locator can be automatic or an operator noting the vessel's position at each temperature reading. In most cases, a radar position locating system, such as disclosed in copending application, Serial No. 809,065, now abandoned, owned by a common assignee, is most desirable; however, other commercially available systems, such as the "Raydist" system can be used. See United States Patent No. 2,528,140 to Hastings. The Marine Automatic Position Indicator made by a subsidiary of the Rayflex Exploration Company, Dallas, Texas, is another satisfactory position locator.

If an air-borne vehicle 13 is used, and this is the preferred method, it is most desirable to use an infrared temperature measuring device as detector 15. Air-borne scanning and heat measuring equipment, such as shown in United States Patent No. 2,412,165 to McDermott and No. 2,423,885 to Hammond can be used. If either of these systems are utilized, the sensitivity of the detecting system can be greatly increased by using present-day commercially available semiconductor infrared detectors instead of the detectors contemplated by the patents. The new detectors can be installed in the cited systems by one skilled in the art. However, the preferred device is the Air-borne Radiation Thermometer, Model 14–320, produced and sold by the Barnes Engineering Company of Stamford, Connecticut. This air-borne infrared heat sensing system is capable of measuring water body surface temperature variations to less than .1° C. and has an optical system with a 2.2 by 2.2 degree field of view. In most cases, a heat sensing device capable of detecting temperature variations to 1 degree is satisfactory; however, more sensitivity is desirable. By flying a preselected grid at a preselected altitude over the area of interest, an infrared temperature survey is recorded on a strip chart recorder that is an integral part of the system. If desired, various types of well known position indicators, such as listed with the water-borne vehicle, can be used with the chart recorder. If desired, the output of the Air-borne Radiation Thermometer can be modified in a well known manner to cause temperature variations to appear as changes of tone on an infrared map of the area surveyed. A position locating system may or may not be required with the map type presentation, depending on the area surveyed. If the area of interest is such that the map always shows recognizable features, locating system 17 is not required. Regardless of the equipment used, after a large area of interest has been surveyed, the areas showing temperature variations are usually further investigated by the same method or by a direct method to verify the presence of indicated seeps. The preferred direct method of verifying the presence of a seep in the area of temperature variation is to use an infrared analyzer, as taught in Slobod et al. Other methods, such as water sampling for laboratory analysis or filtered infrared photography, etc., as taught by copending application, Serial No. 85,081, now Patent 3,143,648, owned by a common assignee, etc., can be used.

If the seeps survey is to be conducted over a body of fresh water, it may be desirable to scan the surface for a resistivity anomaly, instead of a thermal anomaly. However, the depth of the water and the estimated size of the seeps in the area will usually determine if the resistivity method is possible. Since the mineralization effect of a seep is usually masked in salt water and more easily masked than the temperature effect in fresh water, resistivity surveys are usually confined to relatively shallow bodies of water containing slowly moving fresh water. Resistivity anomalies in the surface of a body of water are produced generally in the same manner as the above-described temperature anomalies. Refer again to FIGURE 1. It is clear that as gas 1 moves from deposit 3 toward the surface of body of water 9, it passes through sands, such as, 21 and 23, bearing mineralized subsurface waters. It is equally clear that portions of these subsurface waters and minerals dissolved or entrained therein are also moved to the surface by gas 1. Because of this action, minerals are added to the underlying surface waters and to the surface of the body of water and this increase in mineralization decreases the water resistivity. This decrease is readily detectable except in water already heavily mineralized, or in shallow, stationary fresh water. In either of these two cases, the mineralization effect is usually masked. However, if the seep is large, a resistivity variation can sometimes be detected even in these waters.

Various commercially available "off-the-shelf" portable resistivity meters can be used to practice this method. United States Patents 2,599,413 to Reichertz and 2,871,445 to Carter et al. show two portable resistivity meters that can be used. The desired resistivity meter can be mounted in a water-borne vehicle, a land-borne vehicle, or, in some cases, hand carried or pack mounted so that the areas of interest may be checked as desired. Regardless of the type of detector system used and whether the readings are continuous or intermittent, the requirement for a position locator 17 and recorder 19, FIGURE 2, will depend on the water-covered area over which the survey is conducted. In operations where the measuring points are easily identifiable 17 and 19 are not required.

If the survey is conducted over bodies of water, such as, shallow, fresh-water creeks or streams, a novel modified resistivity survey can be conducted. In this case, intermittent readings are taken in a lineal pattern along the creek to bracket the seep instead of taking readings in an area pattern to produce a map coverage of the area as usually practiced in the above-described temperature surveys.

The preferred method of detecting seeps indications in a shallow, fresh-water creek includes taking intermittent resistivity readings at different locations along the course of the stream. A significant anomaly or variation in adjacent readings taken along the same body of water indicates the possible presence of a seep in the area bracketed by the two readings. The resistivity survey is based on the fact that a particular creek possesses a characteristic resistivity and the presence of a hydrocarbon seep changes this characteristic resistivity over a limited area. It is well known that the natural characteristic resistivity in a a particular body of water depends upon the type of water source and the type of minerals in the creek bed. In many cases, this natural, characteristic resistivity is changed by foreign material from man-made or other sources removed from the water body itself. However, in any event, the water in a given area will possess a total characteristic resistivity. It has been found that when naturally occurring gas seeps from a petroliferous deposit exist in the body of water they materially affect this total characteristic resistivity in the immediate area of the seeps by lifting mineralized subsurface waters to the surface of the creek as explained heretofore. Even a small seep on the order of one-tenth to two cubic feet per hour commonly causes surface water resistivity variations on the order of 3 to 10 ohms at considerable distances from the seep depending on the relative size of the seep and the depth and flow rate of the creek.

Figure 3:
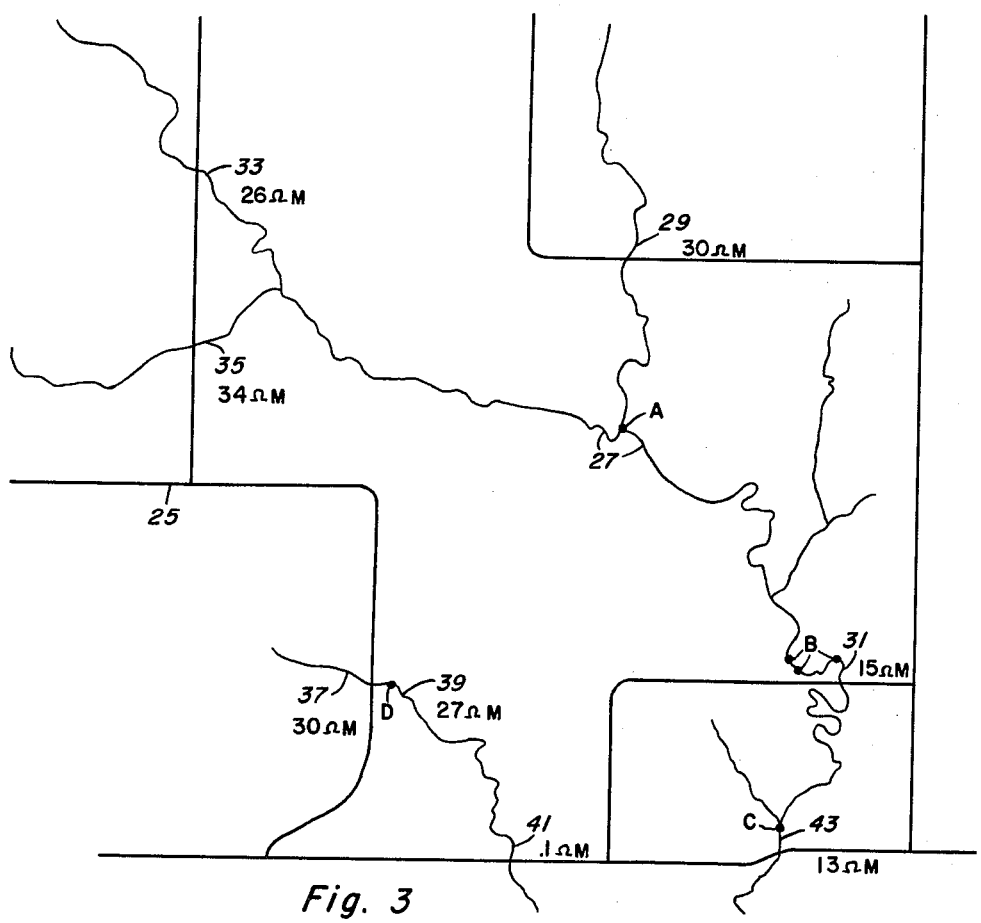
FIGURE 3 shows an area actually surveyed using the invention.

FIGURE 3 shows a north Texas area actually surveyed using this method of seeps detection. The road network is represented as 25 and the streams are represented as 27. At the time when the survey was conducted, the creek beds contained slowly running fresh water which had not been diluted by rain for several days. Since road network 25 crosses streams 27 in a number of places along their courses, an experimental exploration type resistivity survey was conducted by traveling along the roads and taking resistivity readings at the crossings as shown. Of course, in many areas there are not sufficient crossings to provide adequate testing sites and additional tests must be made at points other than at stream crossings. In the case illustrated in FIGURE 3, however, testing sites were deemed adequate for purposes of an exploratory survey and resistivity readings were taken at points 29 through 43. Readings 37 and 39 were taken at the same crossing because both sides of the creek were readily accessible from the road. The ohmmeter readings adjacent each testing point indicates the resistivity of the water at that point. As each reading was made, the pertinent information was posted on a map of the area so that the readings could be identified at a later date. After the initial or exploratory survey was made, verifying or confirmation tests were conducted in segments of the stream bracketed by resistivity variations. Of course, creek branches or substantial segments thereof that exhibited no or very small resistivity variations were not investigated further since the chance of their containing a seep was very small. The suspect or bracketed areas were investigated and seeps locations pin-pointed by walking or traveling along the streams in a suitable vehicle and obtaining water samples at visible bubble points. These water samples were tested in the laboratory and found to contain methane gas. Verified methane seeps locations found by this survey are shown as points A through D. The size of the individual seep ranged from one-quarter to one cubic foot per hour. Investigation proved that the extremely low reading at point 41 was caused by a nearby salt water disposal unit.

It should be understood that the suspect areas could have been verified as containing methane producing seeps in other ways, such as, with a portable total hydrocarbon detector, an infrared analyzer adapted to detect gaseous hydrocarbons, etc., instead of by the laboratory analysis used. It should also be understood that in swamp areas where marsh gas exists, further verification is necessary to distinguish swamp gas from seeps originating from petroliferous deposits. It has been found that resistivity readings can also be used to distinguish between marsh gas and methane gas originating from a hydrocarbon deposit. This distinction is possible since marsh gas is surface or near-surface originating methane and hence it does not lift subsurface waters and minerals to change the resistivity profile of the surface of the water body. Therefore, if the resistivity of the water adjacent the boil or anomaly is materially lower than the water in the vicinity, the boil or anomaly is a valid seep from a petroliferous deposit.

It will be obvious to those skilled in the art that various modifications and substitutions of equivalent steps and elements may be made without departing from the present invention and that the specific steps and elements shown in the drawings and described herein are merely illustrative. Therefore, it shall be understood that the present invention is limited only by the claims contained herein.

We claim:

1. A method of exploration for subterranean petroliferous deposits located below a body of water comprising:
   (a) establishing a predetermined survey pattern in the area to be explored;
   (b) detecting a physical property of the surface of the water in situ at a plurality of locations along said survey pattern; and
   (c) correlating characteristic variations of said physical property, resulting from petroliferous fluids seeping from the subterranean deposits and carrying with them waters located between said subterranean deposits and the surface of the body of water, with the locations in said body of water of said characteristic variations.

2. A method in accordance with claim 1 wherein the predetermined survey pattern is a preselected grid crossing the body of water.

3. A method in accordance with claim 1 wherein the predetermined survey pattern is a selected pattern of streams traversing the area to be explored.

4. A method in accordance with claim 1 wherein the plurality of locations along the survey pattern are covered by continuously detecting the physical property.

5. A method in accordance with claim 1 wherein the plurality of locations along the survey pattern are covered by intermittently detecting the physical property.

6. A method in accordance with claim 1 wherein the physical property is electrical resistivity.

7. A method in accordance with claim 1 wherein the physical property is temperature.

8. A method in accordance with claim 1 wherein the characteristic variations of the physical property are recorded on a map of the area explored.

9. A method of determining whether hydrocarbon gas present in water adjacent the surface of a body of water at a known location is marsh gas or gas seeping to the surface from a subterranean petroliferous deposit comprising:
   (a) measuring the electrical resistivity of the surface of the body of water at the known location of the hydrocarbon gas; and
   (b) measuring the electrical resistivity of the surface of the body of water at at least one second location spaced from said known location of said hydrocarbon gas, whereby a difference in the measured resistivities is diagnostic of gas seeping from a subterranean petroliferous deposit.

References Cited in the file of this patent

UNITED STATES PATENTS

| | | |
|---|---|---|
| 1,158,967 | Bellingham | Nov. 2, 1915 |
| 2,165,214 | Blau et al. | July 11, 1939 |
| 2,412,165 | McDermott | Dec. 3, 1946 |
| 2,423,885 | Hammond | July 15, 1947 |
| 2,879,663 | Thomas | Mar. 31, 1959 |
| 2,918,579 | Slobod et al. | Dec. 22, 1959 |
| 2,922,103 | Smith | Jan. 19, 1960 |
| 2,963,583 | Lebourg | Dec. 6, 1960 |
| 3,008,046 | Carpenter | Nov. 7, 1961 |
| 3,032,655 | Romans | May 1, 1962 |